1125474B2

United States Patent
Ashihara et al.

(10) Patent No.: US 12,125,474 B2
(45) Date of Patent: Oct. 22, 2024

(54) LEARNING APPARATUS, ESTIMATION APPARATUS, METHODS AND PROGRAMS FOR THE SAME

(71) Applicant: NIPPON TELEGRAPH AND TELEPHONE CORPORATION, Tokyo (JP)

(72) Inventors: Takanori Ashihara, Tokyo (JP); Yusuke Shinohara, Tokyo (JP); Yoshikazu Yamaguchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 414 days.

(21) Appl. No.: 17/640,423

(22) PCT Filed: Sep. 6, 2019

(86) PCT No.: PCT/JP2019/035105
§ 371 (c)(1),
(2) Date: Mar. 4, 2022

(87) PCT Pub. No.: WO2021/044606
PCT Pub. Date: Mar. 11, 2021

(65) Prior Publication Data
US 2022/0335927 A1    Oct. 20, 2022

(51) Int. Cl.
*G10L 15/06*    (2013.01)
*G10L 25/24*    (2013.01)
*G10L 25/51*    (2013.01)

(52) U.S. Cl.
CPC ............ *G10L 15/063* (2013.01); *G10L 25/24* (2013.01); *G10L 25/51* (2013.01)

(58) Field of Classification Search
CPC ........ G10L 15/063; G10L 25/24; G10L 25/51
See application file for complete search history.

(56) References Cited

U.S. PATENT DOCUMENTS

2017/0076740 A1* 3/2017 Feast ..................... H04L 67/535
2019/0318722 A1* 10/2019 Bromand ................ G10L 13/02

OTHER PUBLICATIONS

LSTM Based Whisper Detection (Year: 2020).*
Whisper Speech Recognition Using Deep Denoising Autoencoder and Inverse Filtering (Year: 2017).*
Raeesy et al. (2018) "LSTM-based whisper detection" SLT, Dec. 18, 2018.

* cited by examiner

*Primary Examiner* — Mohammad K Islam

(57) ABSTRACT

A learning device includes a learning unit learning, with a first feature value having a first feature and given a first value label, a second feature value having a second feature and given a second value label and a third feature value having a feature between the first feature and the second feature and given a value label having a value between the first value label and the second value label as teacher data, a model for estimating which of the first feature and the second feature an input feature value sequence has.

20 Claims, 6 Drawing Sheets

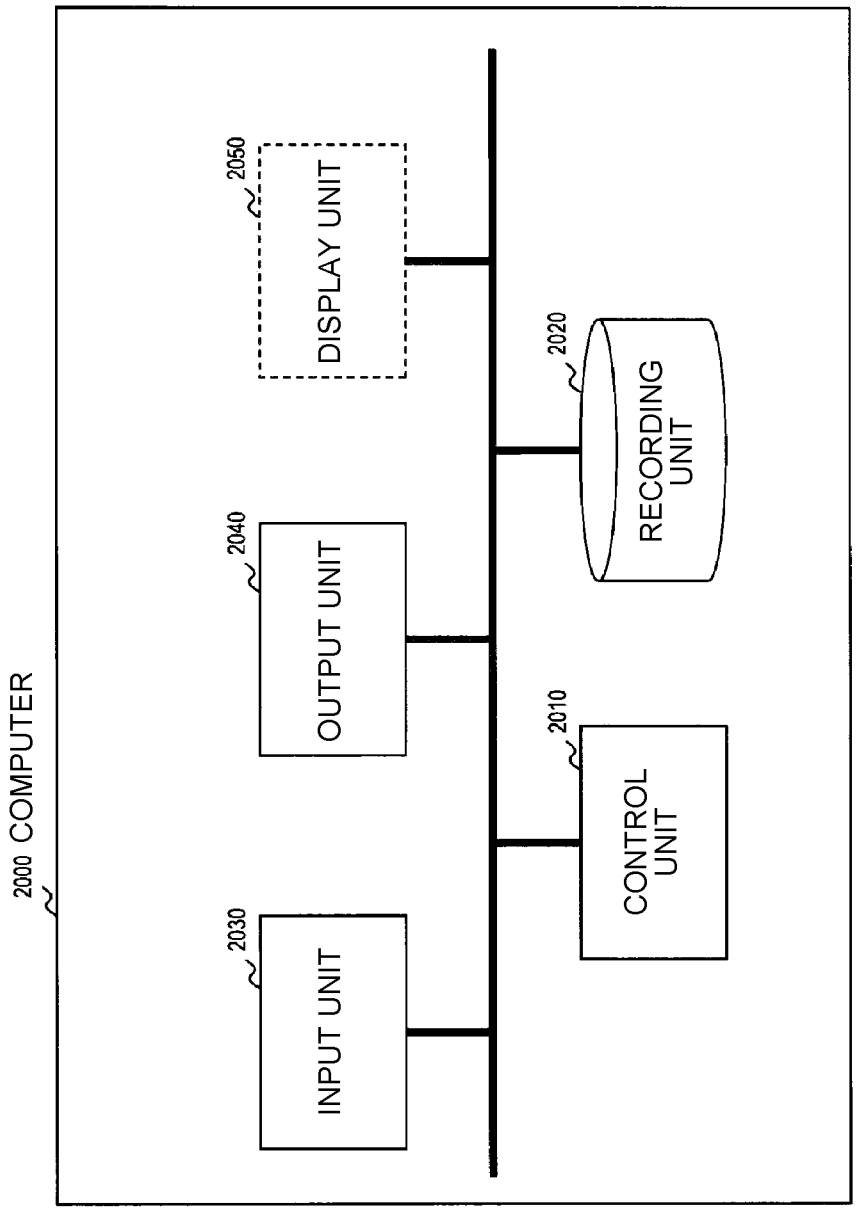

LEARNING APPARATUS, ESTIMATION APPARATUS, METHODS AND PROGRAMS FOR THE SAME

CROSS-REFERENCE TO RELATED APPLICATIONS

This application is a U.S. National Stage Application filed under 35 U.S.C. § 371 claiming priority to International Patent Application No. PCT/JP2019/035105, filed on 6 Sep. 2019, the disclosure of which is hereby incorporated herein by reference in its entirety.

TECHNICAL FIELD

The present invention relates to a learning device to learn a model for discriminating utterance voice having a certain feature and utterance voice having a feature different from the certain feature, an estimation device using the learned model, methods therefor, and a program.

BACKGROUND ART

As a prior-art technique for learning a model for discriminating between utterance voice having a feature found when a whisper is made (hereinafter also referred to as "whisper utterance voice") and utterance voice other than that (hereinafter also referred to as "normal utterance voice"), Non-Patent Literature 1 is known. The whisper utterance voice refers to such utterance voice that an excitation voice source is completely voiceless. At the time of learning such a model, desired learning data is obtained by collecting whisper utterance voice and normal utterance voice in advance and labeling the voices to obtain teacher data.

CITATION LIST

Non-Patent Literature

Non-Patent Literature 1: Z. Raeesy, K. Gillespie, C. Ma, T. Drugman, J. Gu, R. Maas, A. Rastrow, B. Hoffmeister, "LSTM-based whisper detection", SLT, 2018.

SUMMARY OF THE INVENTION

Technical Problem

However, as teacher data, the number of pieces of data of whisper utterance voice is small. In general, as for such a statistical model as is used in voice recognition and the like, by performing learning using actual data of scenes being actually used, accuracy in the use scene is improved. Therefore, even in the case of a model for discriminating between whisper utterance voice and normal utterance voice, if actual data of scenes being actually used can be similarly obtained, improvement of accuracy can be expected by incorporating the data into learning. However, actually, there is little learning data of voiceless sound like whisper utterance voice as described above, and thus it is difficult to improve the accuracy of the model.

An object of the present invention is to provide a learning device capable of improving discrimination accuracy of a model in a case where, in a machine learning algorithm intended to perform binary classification, it is not possible to guarantee sufficient performance due to imbalance of an amount of learning data, an estimation device using a learned model, methods therefor, and a program.

Means for Solving the Problem

In order to solve the above problem, according to one aspect of the present invention, a learning device includes a learning unit learning, with a first feature value having a first feature and given a first value label, a second feature value having a second feature and given a second value label and a third feature value having a feature between the first feature and the second feature and given a value label having a value between the first value label and the second value label as teacher data, a model for estimating which of the first feature and the second feature an input feature value sequence has.

In order to solve the above problem, according to another aspect of the present invention, an estimation device includes an estimation unit estimating, using a model learned with a first feature value having a first feature and given a first value label, a second feature value having a second feature and given a second value label and a third feature value having a feature between the first feature and the second feature and given a value label having a value between the first value label and the second value label as teacher data, which of the first feature and the second feature an input feature value sequence for estimation has, the model being for estimating which of the first feature and the second feature an input feature value sequence has.

Effects of the Invention

According to the present invention, by adding soft utterance voice the appearance frequency of which is relatively higher than that of whisper utterance voice in actual use scenes to learning data as data having an attribute between both utterance voices (whisper utterance voice and normal utterance voice) (a soft label) to learn a model for discriminating between the whisper utterance voice and the normal utterance voice, an effect is obtained that it is possible to improve discrimination accuracy of the learned model. The soft utterance voice is mumbling utterance voice with a low voice pressure in which voiced sound and voiceless sound are mixed.

BRIEF DESCRIPTION OF DRAWINGS

FIG. 6 is a diagram showing a configuration example of a computer to which the present method is applied.

DESCRIPTION OF EMBODIMENT

Figure 1:
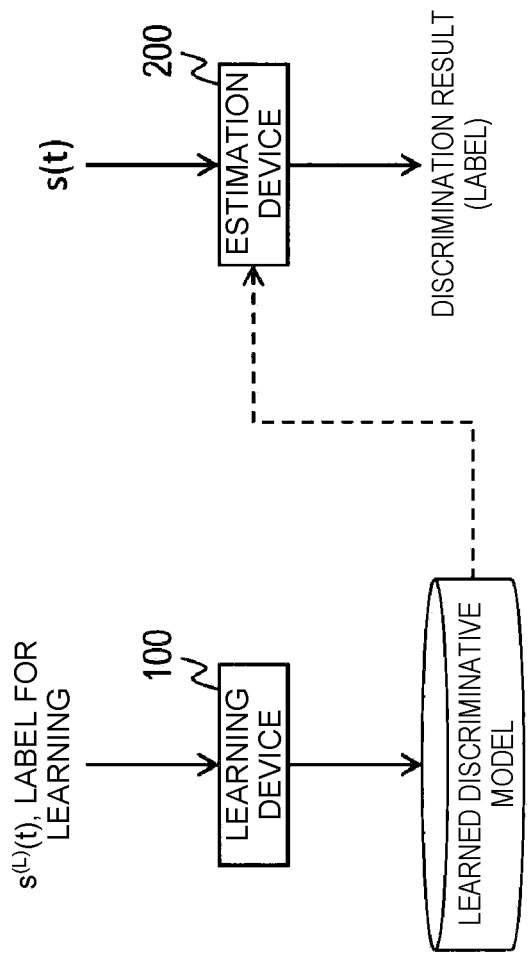
FIG. 1 is a diagram for showing an outline of an estimation system according to a first embodiment.

An embodiment of the present invention will be explained. In drawings used for the description below, the same reference numeral is attached to components having the same function or steps to perform the same process, and duplicated description will be omitted. In the description below, it is assumed that a process for each element of a vector or a matrix is applied to all the elements of the vector or the matrix unless otherwise stated.

Points of First Embodiment

In the present embodiment, when, in learning of a model for the purpose of binary classification, an amount of teacher data is imbalanced between classifications, discrimination accuracy of the model is improved by giving an attribute of a classification between both classifications (a soft label) to data having a feature (a feature value) between classification targets and adding the data to learning data to perform learning.

For example, for the purpose of causing a model for discriminating between normal utterance voice and whisper utterance voice the appearance frequency of which is lower than the normal utterance voice with high accuracy to be learned, an attribute between the whisper utterance voice and the normal utterance voice (a soft label) is given to soft utterance voice the appearance frequency of which is relatively higher than that of the whisper utterance voice in actual use scenes and which has a feature between the normal utterance voice and the whisper utterance voice, and the soft utterance voice is added to learning data to perform learning of the model for discriminating between the whisper utterance voice and the normal utterance voice.

For example, in Reference Literature 1, it is described that, by defining five kinds of utterance modes (Whispered/Soft/Normal/Loud/Shouted) and learning a model that enables analysis of acoustic features of the utterance modes and discrimination among the utterance modes, a voice recognition target voice data is discriminated as any of the five kinds of utterance modes.

(Reference Literature 1) P. Zelinka, M. Sigmund, J. Schimmel, "Impact of vocal effort variability on automatic speech recognition", Speech Communication, 2012.

In general, such utterance voice conscious of privacy that is uttered in actual use scenes, for example, at the time of using a voice recognition service via a smartphone or the like in an open space such as an electric car and a cafe is often rather such soft utterance voice that is positioned between whisper utterance voice and normal utterance than the whisper utterance voice that is completely voiceless. Therefore, it is easier to collect data of soft utterance voice than whisper utterance voice. Acoustic features (such as a voice pressure) of soft utterance voice are between acoustic features of whisper utterance voice and acoustic features of normal utterance voice.

In the present embodiment, paying attention to this point, an attribute between both classifications (a soft label) is given to data having a feature (a feature value) between both classifications. That is, by, in addition to whisper utterance voice data and normal utterance voice data, using data obtained by giving a soft label to soft utterance voice data that acoustically exists at a position between both of the pieces of voice data for learning, further accuracy improvement is realized.

It is known that, in a discriminative model used in image recognition and the like, accuracy is improved by using a soft label at the time of learning the discriminative model. In Reference Literature 2, a method called Mixup is proposed in which two images are superimposed based on a certain weight, and learning is performed with the weight as a teacher soft label at the time of the learning (for example, images of a cat and a dog are mixed at a rate of 0.5 for each, and learning is performed with teacher labels of cat=0.5 and dog=0.5), and accuracy improvement is recognized.

(Reference Literature 2) H. Zhang, M. Cisse, Y. N. Dauphin, D. Lopez-Paz, "mixup: Beyond Empirical Risk Minimization", ICLR (2018)

Therefore, in the present embodiment, since soft utterance voice is thought to be acoustically positioned between whisper utterance voice and normal utterance voice, learning is performed with a teacher label of the soft utterance voice as an intermediate value between a teacher label of the whisper utterance voice and a teacher label of the normal utterance voice, and, thereby, it is possible to cause accuracy to be improved. In the present embodiment, "a voice label giving unit" capable of giving such an intermediate value label is provided before "a discriminative model learning unit".

In a first embodiment, learning of a whisper utterance voice/normal utterance voice discriminative model using soft utterance voice and estimation using the model will be explained.

First Embodiment

FIG. 1 is a diagram for showing an outline of an estimation system according to the first embodiment. The estimation system includes a learning device 100 and an estimation device 200.

The learning device 100 learns a discriminative model with a voice signal for learning and a label corresponding to the voice signal as an input, and outputs the learned model.

The estimation device 200 receives the learned model prior to an estimation process, estimates whether an estimation target voice signal is normal utterance voice or whisper utterance voice using the learned model, with the estimation target voice signal as an input, and outputs an estimation result.

Each of the learning device and the estimation device is, for example, a special device configured by a special program being read into a well-known or dedicated computer that includes a central processing unit (CPU), a main memory (RAM: random-access memory) and the like. Each of the learning device and the estimation device executes each process, for example, under the control of the central processing unit. Data inputted to each of the learning device and the estimation device and data obtained by each process are stored, for example, into the main memory, and the data stored in the main memory is read out to the central processing unit and used for another process as necessary. At least a part of processing units of the learning device and the estimation device may be configured with hardware such as an integrated circuit. Each of storage units provided in the learning device and the estimation device can be configured, for example, with a main memory such as a RAM (random-access memory) or middleware such as a relational database and a key-value store. However, the storage units are not necessarily required to be provided inside the learning device and the estimation device but may be configured with auxiliary storage devices configured with semiconductor memory devices like hard disks, optical disks or flash memories and provided outside the learning device and the estimation device.

Figure 2:
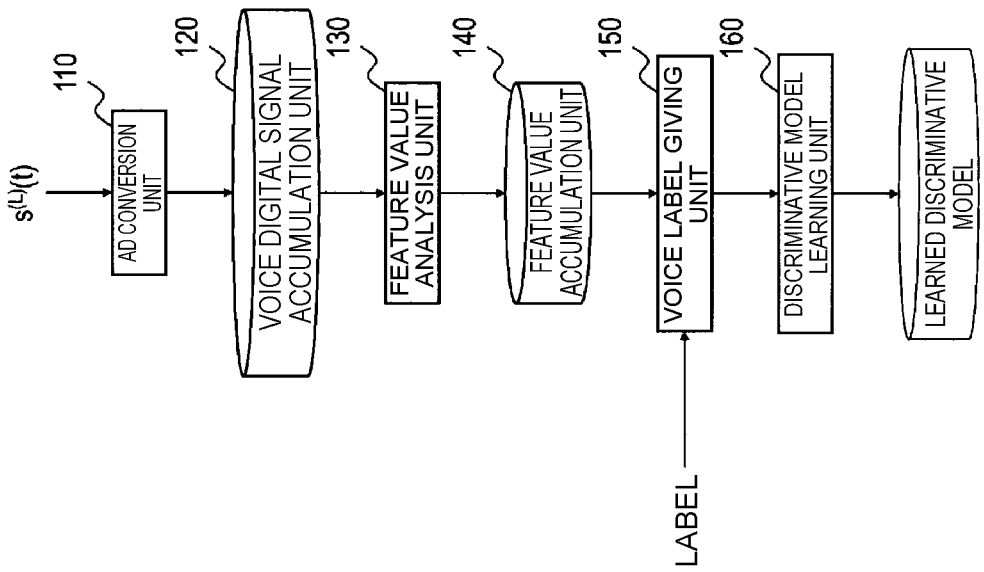
FIG. 2 is a functional block diagram of a learning device according to the first embodiment.
Figure 3:
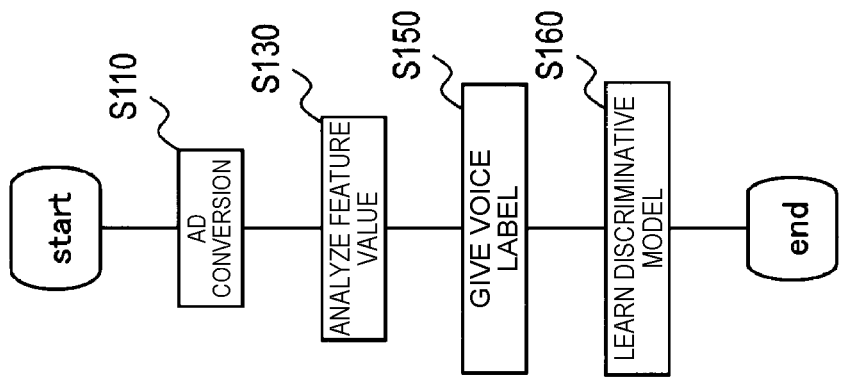
FIG. 3 is a diagram showing a process flow of the learning device according to the first embodiment.

First, explanation will be made on a method of the learning device 100 learning a whisper utterance voice/normal utterance voice discriminative model using soft utterance voice. FIG. 2 is a functional block diagram of a learning device according to the first embodiment, and FIG. 3 shows a process flow of the learning device.

The learning device 100 includes an AD conversion unit 110, a voice digital signal accumulation unit 120, a feature value analysis unit 130, a feature value accumulation unit 140, a voice label giving unit 150 and a discriminative model learning unit 160.

Each unit will be explained below.

<AD Conversion Unit 110>

Input: A voice signal $s^{(L)}(t)$ for learning

Output: A voice digital signal $s_{(L)}(i)$ for learning

Process: The AD conversion unit 110 converts the analog voice signal $s^{(L)}(t)$ to the digital voice digital signal $s^{(L)}(i)$ (S110). Here, t is an index indicating time, and i is an index indicating a sample number (sample time).

<Voice Digital Signal Accumulation Unit 120>

Input: The voice digital signal $s^{(L)}(i)$ for learning

Process: The voice digital signal accumulation unit 120 accumulates a sequence of voice digital signals $s^{(L)}(i), s^{(L)}(i-1), \ldots$.

<Feature Value Analysis Unit 130>

Input: The voice digital signal $s^{(L)}(i)$ for learning

Output: A feature value $S^{(L)}(n)$ for learning

Process: The feature value analysis unit 130 takes out the voice digital signal $s^{(L)}(i)$ from the voice digital signal accumulation unit 120, performs feature value analysis (S130) and extracts the (acoustic) feature value $S^{(L)}(n)$.

As the extracted feature value, for example, one to twelve dimensions of MFCC (Mel-Frequency Cepstrum Coefficient) based on short-time frame analysis of a voice signal, a dynamic parameter such as ΔMFCC or ΔΔMFCC, which is a dynamic feature value of the one to twelve dimensions of MFCC, power, Δpower, ΔΔpower or the like is used. For MFCC, a CMN (cepstrum mean normalization) process may be performed. The feature value is not limited to MFCC or power, but a parameter used for discrimination of whisper utterance voice (for example, an autocorrelation peak value, a group delay or the like) may be used.

For example, in the case of performing analysis for each frame, the feature value analysis unit 130 takes out voice digital signals $s^{(L)}(i), s^{(L)}(i-1), \ldots, s^{(L)}(i-T+1)$ in frames from the voice digital signal accumulation unit 120 for each shift width, performs feature value analysis for each frame (S130) and extracts the (acoustic) feature value $S^{(L)}(n)$. Here, T indicates the number of samples included in one frame, and n is an index indicating a frame number.

<Feature Value Accumulation Unit 140>

Input: The feature value $S^{(L)}(n)$ for learning

Process: The feature value accumulation unit 140 accumulates a sequence of feature values $S^{(L)}(n), S^{(L)}(n-1), \ldots$.

<Voice Label Giving Unit 150>

Input: The sequence of feature values $S^{(L)}(n), S^{(L)}(n-1), \ldots$ for learning; labels for learning Output: Labeled learning data $(S^{(L)}(n), r^{(L)}(n)), (S^{(L)}(n-1), r^{(L)}(n-1)), \ldots$ Process: The voice label giving unit 150 takes out the sequence of feature values $S^{(L)}(n), S^{(L)}(n-1), \ldots$ from the feature value accumulation unit 140 and gives corresponding labels $r^{(L)}(n), r^{(L)}(n-1), \ldots$ to the sequence of feature values $S^{(L)}(n), S^{(L)}(n-1), \ldots$ (S150) to obtain the labeled learning data $(S^{(L)}(n), r^{(L)}(n)), (S^{(L)}(n-1), r^{(L)}(n-1)), \ldots$ For example, a, b and c (a<c<b or b<c<a) are given to normal utterance, whisper utterance and soft utterance voice, respectively, as teacher labels. For example, a=0 and b=1, or a=1 and b=0 are assumed. The labels are manually given for each predetermined unit (for each voice file, for each utterance, for each word, for each frame or the like).

As a way to decide the value c, ((a+b)/2), an average value of a and b, may be used. An appropriate value between a and b may be manually set. The value c may be determined by experiments or simulation and set. Further, a semi-supervised approach may be adopted. For example, a=0 and b=1, or a=1 and b=0 are set; and soft utterance voice is discriminated as whisper utterance voice or normal utterance voice using a discriminative model learned once only with whisper utterance voice and normal utterance voice; and a probability value obtained as a result may be used as the value C of the teacher label of the soft utterance voice.

<Discriminative Model Learning Unit 160>

Input: The labeled learning data $(S^{(L)}(n), r^{(L)}(n)), (S^{(L)}(n-1), r^{(L)}(n-1)), \ldots$ Output: A Learned Discriminative Model Process: The discriminative model learning unit 160 learns a model for discriminating between whisper utterance voice and normal utterance voice using the labeled learning data $(S^{(L)}(n), r^{(L)}(n)), (S^{(L)}(n-1), r^{(L)}(n-1)), \ldots$ obtained by giving labels to the feature value sequence (S160).

In the present embodiment, since two-class classification between whisper utterance voice and normal utterance voice is performed, any model that enables the classification is possible. For example, a GMM model, a DMM model or the like is often used as in Non-patent Literature 1 and Reference Literature 1. At the time of learning, the learning is performed, with a teacher label for whisper utterance voice, a teacher label for normal utterance voice and a teacher label for soft utterance voice set as a, b, and a value c given by "the soft utterance voice giving unit", respectively. This model outputs a value closer to a as the probability that an estimation target voice signal is whisper utterance voice is higher, and outputs a value closer to b as the probability that the estimation target voice signal is normal utterance voice is higher.

Figure 4:
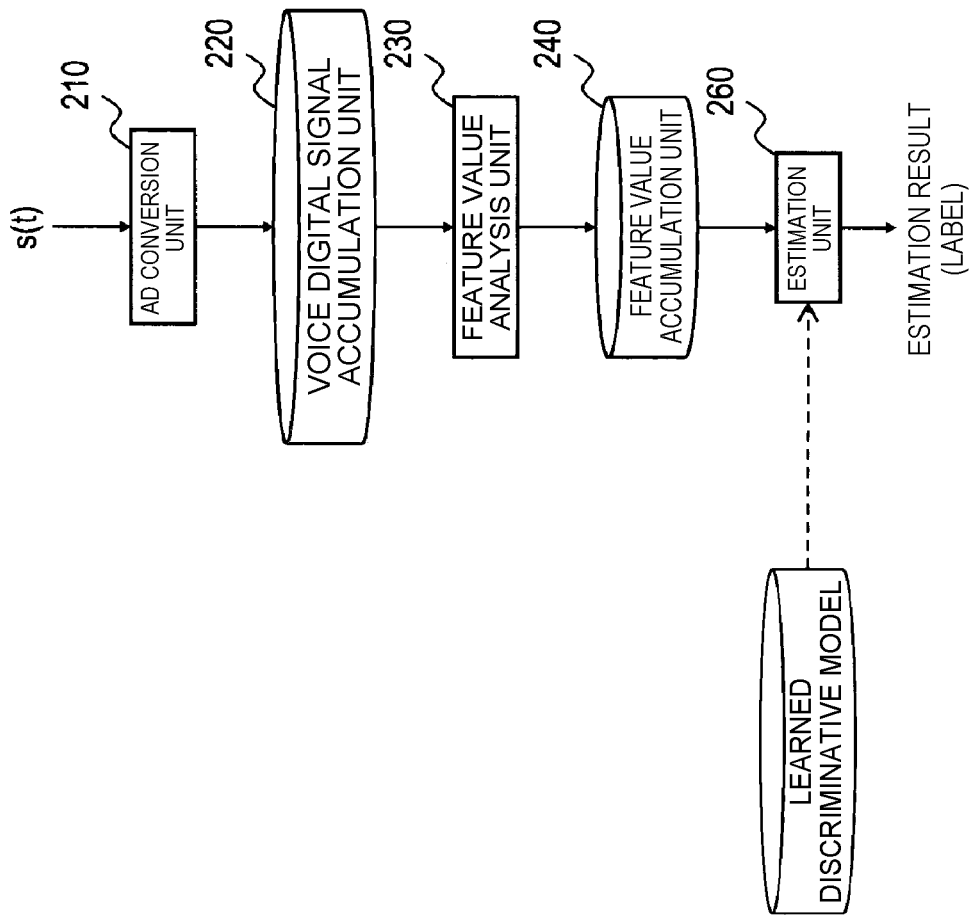
FIG. 4 is a functional block diagram of an estimation device according to the first embodiment.
Figure 5:
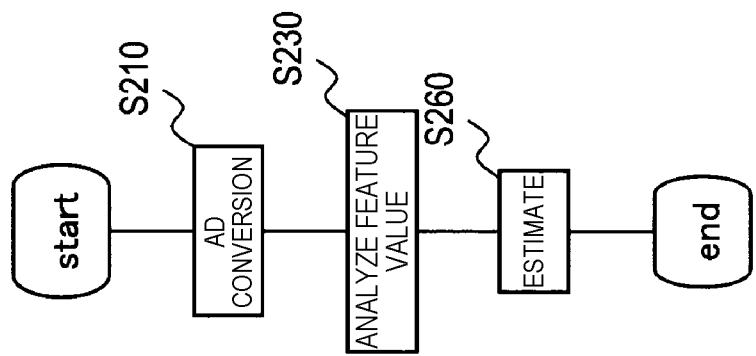
FIG. 5 is a diagram showing a process flow of the estimation device according to the first embodiment.

Next, the estimation device 200 will be explained. FIG. 4 is a functional block diagram of an estimation device according to the first embodiment, and FIG. 5 shows a process flow of the estimation device.

The estimation device 200 includes an AD conversion unit 210, a voice digital signal accumulation unit 220, a feature value analysis unit 230, a feature value accumulation unit 240 and an estimation unit 260.

The AD conversion unit 210, the voice digital signal accumulation unit 220, the feature value analysis unit 230 and the feature value accumulation unit 240 perform a process from S210 to S240 similar to the process from S110 to S140 for an estimation target voice signal or a signal derived from the estimation target voice signal instead of a voice signal for learning or a signal derived from the voice signal for learning.

<Estimation Unit 260>

Input: A feature value sequence $S(n), S(n-1), \ldots$

Output: An estimation result (label)

Process: The estimation unit 260 receives a learned model prior to an estimation process.

The estimation unit 260 estimates whether the feature value sequence $S(n), S(n-1), \ldots$ is whisper utterance voice or normal utterance voice using a learned model (a model for discriminating between whisper utterance voice and normal utterance voice) (S260) and outputs a label indicating being whisper utterance voice or normal utterance voice as an estimation result. For example, if the learned model is a model that outputs a value closer to a as the probability that an estimation target voice signal is whisper utterance voice is higher, and outputs a value closer to b as the probability that the estimation target voice signal is normal utterance voice is higher, the estimation unit 260 determines whether whisper utterance voice or normal utterance voice based on a magnitude relationship between an output value of the model and a threshold and outputs a label corresponding to a determination result as an estimation result. For example, in the case of a model that outputs a value closer to 1 as the probability that an estimation target voice signal is whisper utterance voice is higher, and outputs a value closer to 0 as the probability that the estimation target voice signal is normal utterance voice is higher, the estimation unit 260 determines that an estimation target voice signal is whisper utterance voice if an output value of the model is larger than a threshold and determines that the estimation target voice signal is normal utterance voice if the output value of the model is equal to or smaller than the threshold, based on a magnitude relationship between the output value of the model and the threshold. In this case, the threshold is a value larger than 0 and smaller than 1 and is a value determined by experiments, simulations and the like prior to the estimation process, for example, 0.5.

Effects

According to the above configuration, by performing learning of a model for discriminating between whisper utterance voice and normal utterance voice, with soft utterance voice being added to learning data as teacher data having an attribute between both utterance voices, it is possible to improve discrimination accuracy of the learned model.

<Modification>

In the present embodiment, a model is learned, with a feature value extracted from normal utterance voice and its teacher label (for example, a), a feature value extracted from whisper utterance voice and its teacher label (for example, b) and a feature value extracted from soft utterance voice (a feature value between the feature value extracted from the normal utterance voice and the feature value extracted from the whisper utterance voice) and its teacher label (a<c<b or a>c>b) as teacher data. However, the present invention can be applied to any learning device that learns, with a first feature value having a certain feature (hereinafter also referred to as a first feature) and given a first value label corresponding to the first feature, a second feature value having a feature different from the first feature (hereinafter also referred to as a second feature) and given a second value label corresponding to the second feature and a third feature value having a feature between the first feature and the second feature (hereinafter also referred to as a third feature) and given a value label having a value between the first value label and the second value label as teacher data, a model for estimating which of the first feature and the second feature an input feature value sequence has. That is, the first feature is not limited to the feature of normal utterance voice; the second feature is not limited to the feature of whisper utterance voice; and the third feature is not limited to soft utterance voice. For example, a feature of non-normal utterance, which is utterance other than normal utterance, may be used as the second feature, and a feature between the normal utterance and the non-normal utterance may be used as the third feature. More specifically, the present invention may be applied, with the first feature as the feature of normal utterance voice, the second feature as a feature of shouted utterance voice, and the third feature as a feature of loud utterance voice.

<Other Modifications>

The present invention is not limited to the embodiment and modification described above. For example, the various kinds of processes described above may be not only executed in time-series according to the description but also executed in parallel or individually according to processing capability of devices that execute the processes or as necessary. In addition, the present invention can be appropriately changed within a range not departing from the spirit of the invention.

<Program and Recording Medium>

The various kinds of processes described above can be implemented by causing a program for causing each step of the above method to be executed, to be read into a recording unit 2020 of a computer shown in FIG. 6 and causing a control unit 2010, an input unit 2030, an output unit 2040 and the like to operate.

The program in which content of the processes is written can be recorded in a computer-readable recording medium. As the computer-readable recording medium may be anything, for example, a magnetic recording device, an optical disk, a magneto-optical recording medium, a semiconductor memory or the like.

Further, distribution of this program is performed, for example, by selling, transferring or lending a portable recording medium such as a DVD or a CD-ROM in which the program is recorded. Furthermore, a configuration is also possible in which the program is distributed by storing the program in a storage device of a server computer and transferring the program from the server computer to other computers via network.

For example, a computer that executes such a program stores the program recorded in a portable recording medium or transferred from a server computer into its own storage device once. Then, at the time of executing the processes, the computer reads the program stored in its own recording medium and executes the processes according to the read program. Further, as other execution forms of this program, the computer may directly read the program from a portable recording medium and execute the processes according to the program; and, furthermore, each time a program being transferred to the computer from the server computer, a process according to the received program may be executed each time. Further, a configuration is also possible in which transfer of the program from the server computer to the computer is not performed, and the above processes are executed by a so-called ASP (application service provider) type service of realizing processing functions only by an instruction to execute the program and acquisition of a result. It is assumed that the program in the present embodiment includes information that is provided for processing by an electronic calculator and is equivalent to a program (data and the like that are not direct commands to a computer but have a nature of prescribing processing of the computer).

Further, though the present device is configured by causing a predetermined program on a computer to be executed, in this embodiment, at least a part of content of the processes may be realized by hardware.

The invention claimed is:

1. A learning device comprising a processor configured to execute a method comprising:
    learning, with at least:
        a first feature value having a first feature and given a first value label,
        a second feature value having a second feature and given a second value label, and a third feature value having a third feature between the first feature and the second feature and given a value label having a value between the first value label and the second value label as teacher data, a model for estimating which of the first feature and the second feature an input feature value sequence has.

2. The learning device according to claim 1,
wherein the first feature is a feature of normal utterance,
wherein the second feature is a feature of non-normal utterance, and
wherein the third feature is a feature between the normal utterance and the non-normal utterance.

3. The learning device according to claim 1,
wherein the first feature is a feature of normal utterance,
wherein the second feature is a feature of whisper utterance, and
wherein the third feature is a feature of soft utterance.

4. An estimation device comprising a processor configured to execute a method comprising;
estimating, using a model learned with at least:
a first feature value having a first feature and given a first value label,
a second feature value having a second feature and given a second value label, and
a third feature value having a third feature between the first feature and the second feature and given a value label having a value between the first value label and the second value label as teacher data, which of the first feature and the second feature an input feature value sequence for estimation has,
the model being for estimating which of the first feature and the second feature an input feature value sequence has.

5. A computer-implemented method for learning a model for discriminating utterance voice, the method comprising:
learning, with at least:
a first feature value having a first feature and given a first value label,
a second feature value having a second feature and given a second value label, and
a third feature value having a third feature between the first feature and the second feature and given a value label having a value between the first value label and the second value label as teacher data,
a model for estimating which of the first feature and the second feature an input feature value sequence has.

6. The learning device according to claim 1, wherein the first feature is associated with utterance.

7. The learning device according to claim 1, wherein the first feature value is based on at least one of a plurality of dimensions of a Mel-frequency cepstrum coefficient associated with a voice signal.

8. The learning device according to claim 1, wherein the first feature value is based at least on a frequency of a voice signal associated to utterance.

9. The learning device according to claim 1, wherein the first feature is one of:
whispered utterance,
soft utterance,
normal utterance,
loud utterance, or
shouted utterance.

10. The estimation device according to claim 4,
wherein the first feature is a feature of normal utterance,
wherein the second feature is a feature of non-normal utterance, and
wherein the third feature is a feature between the normal utterance and the non-normal utterance.

11. The estimation device according to claim 4,
wherein the first feature is a feature of normal utterance,
wherein the second feature is a feature of whisper utterance, and
wherein the third feature is a feature of soft utterance.

12. The estimation device according to claim 4, wherein the first feature is associated with utterance.

13. The estimation device according to claim 4, wherein the first feature value is based on at least one of a plurality of dimensions of a Mel-frequency cepstrum coefficient associated with a voice signal.

14. The estimation device according to claim 4, wherein the first feature value is based at least on a frequency of a voice signal associated to utterance.

15. The estimation device according to claim 4, wherein the first feature is one of:
whispered utterance,
soft utterance,
normal utterance,
loud utterance, or
shouted utterance.

16. The computer-implemented method according to claim 5,
wherein the first feature is a feature of normal utterance,
wherein the second feature is a feature of non-normal utterance, and
wherein the third feature is a feature between the normal utterance and the non-normal utterance.

17. The computer-implemented method according to claim 5,
wherein the first feature is a feature of normal utterance,
wherein the second feature is a feature of whisper utterance, and
wherein the third feature is a feature of soft utterance.

18. The computer-implemented method according to claim 5,
wherein the first feature value is based on at least one of a plurality of dimensions of a Mel-frequency cepstrum coefficient associated with a voice signal.

19. The computer-implemented method according to claim 5,
wherein the first feature value is based at least on a frequency of a voice signal associated to utterance.

20. The computer-implemented method according to claim 5, wherein the first feature is one of:
whispered utterance,
soft utterance,
normal utterance,
loud utterance, or
shouted utterance.

* * * * *